United States Patent [19]

Ohzeki et al.

[11] Patent Number: 4,565,546
[45] Date of Patent: Jan. 21, 1986

[54] CONDENSATION PRODUCT AND USE THEREOF AS DISPERSANT FOR PITCH IN WATER SLURRY

[75] Inventors: Osamu Ohzeki, Fukui; Katsuhiko Shimakawa; Akihiko Shimizu, both of Sabae; Toshio Kanai, Yokohama, all of Japan

[73] Assignees: Nikka Chemical Industry Co., Fukui; Chiyoda Chem. Engineering & Construction Co. Ltd., Kanagawa, both of Japan

[21] Appl. No.: 625,216

[22] Filed: Jun. 27, 1984

[30] Foreign Application Priority Data

Jun. 28, 1983 [JP] Japan ................................. 58-117764

[51] Int. Cl.$^4$ ............................................... C10L 1/32

[52] U.S. Cl. .......................................... 44/51; 44/61; 260/505 C; 260/512 C

[58] Field of Search ............................... 44/51, 61, 76; 252/311.5; 260/505 C, 512 C

[56] References Cited

PUBLICATIONS

Pharmaceutical Bulletin, vol. 2, 163–173 (1954).

Primary Examiner—William R. Dixon, Jr.
Assistant Examiner—Margaret B. Medley
Attorney, Agent, or Firm—Pahl, Lorusso & Loud

[57] ABSTRACT

A novel condensation product obtained by reaction of an aldehyde and two kinds of sulfonic acid group-containing aromatic compounds. The product is useful as a dispersant for forming a pitch-in-water slurry.

20 Claims, No Drawings

CONDENSATION PRODUCT AND USE THEREOF AS DISPERSANT FOR PITCH IN WATER SLURRY

BACKGROUND OF THE INVENTION

This invention relates to a novel condensation product obtained by reaction of an aldehyde and two specific kinds of aromatic compounds. The present invention is also concerned with an aqueous pitch-containing composition in which the novel condensation product is used as a dispersant for pitch. The present invention is also directed to a method of forming a pitch in water slurry.

As a result of the decrease of high quality petroleum crude oils in recent years, the need has increased for converting heavy, poor quality hydrocarbon oils into light hydrocarbon oils. Thus, a variety of petroleum refining plants have been constructed for performing the conversion of heavy oils into light oils by the solvent deasphalting method, the thermal cracking method, a catalytic cracking method or the like method. These processes unavoidably yield, as a by-product, pitch formed of extremely heavy hydrocarbon components. Since pitch has generally a lower content of ash and a higher heating value than coal, an attempt has been made for the utilization of pitch as a fuel for various combustion installations. However, unlike liquid petroleum, pitch is a solid at room temperature and, therefore, requires relatively high costs such as for transportation and storage. Further, since pitch in the molten state fails to exhibit a desirable fluidity, it is not possible to use it as a fuel for combustion in a furnace wherein the fuel is passed through pipes and sprayed from a burner nozzle.

SUMMARY OF THE INVENTION

It is, therefore, an objective of the present invention to provide a novel condensation product useful as a dispersant for maintaining finely divided pitch in a dispersed state in an aqueous medium.

Another objective of the present invention is to provide a pitch-containing composition useful as a fuel.

A further objective of the present invention, is to provide a composition in the form of a slurry or dispersion having excellent stability and fluidity for a long period of time.

A special objective of the present invention is to provide a composition of the above-mentioned type which can be sprayed, for combustion, from the conventional burner nozzle.

Yet a further objective of the present invention is to provide a method for forming a pitch in water slurry.

In accomplishing the foregoing objectives there is provided in accordance with the present invention a condensation product consisting essentially of one or more monomer units expressed by the general formula (I) and one or more monomer units expressed by the general formula (II):

 (I)

 (II)

wherein

Y stands for a first aromatic radical having a valence of $(m+n)$ and containing one or more sulfonic acid or sulfonate groups, Z stands for a second aromatic radical having a valence of $(u+v)$ and containing one or more sulfonic acid or sulfonate groups, r is bonded to an aromatic carbon atom of the first aromatic radical Y and stands for H or

where b is OH or an intermolecular direct bond to an aromatic carbon of Y or Z and R represents hydrogen or an alkyl, s is bonded to an aromatic carbon atom of the second aromatic radical Z and stands for H or

where d is OH or an intermolecular direct bond to an aromatic carbon of Y or Z and R has the same meaning as above, p is bonded to an aromatic carbon atom of the first aromatic radical Y and stands for H,

or an intermolecular direct bond to CHR of r or s, q is bonded to an aromatic carbon atom of the second aromatic radical Z and stands for H,

or an intermolecular direct bond to CHR of r or s, and m, n, u and v are each a positive integer, the monomer unit (I), when p and r are each hydrogen, having a ratio of its organic character value to inorganic character value of at least 0.6, the monomer unit (II), when q and s are each hydrogen, having a ratio of its organic character value to inorganic character value of not greater than 0.5.

The terms "organic character value" and "inorganic character value" used herein are described in detail in, for example, *Pharmaceutical Bulletin*, vol. 2, No. 2, 163-173 (1954) and *Kagakuno Ryoiki*, vol. 11, No. 10, 719-725 (1957), the disclosure of which is herein incorporated by reference. A ratio of organic character value to inorganic character value corresponds to an HLB value used in the field of nonionic surfactants. For the purpose of the present invention, the organic character value to inorganic character value ratio of a sulfonate group-containing aromatic compound is determined on the basis of its corresponding sulfonic acid compound, i.e. the ratio is the same as that of the corresponding sulfonic acid group-containing aromatic compound.

In short, the organic and inorganic characters represent physical properties inherent to each organic compound. The organic character is a factor representing the accumulation of covalent bonds of a hydrocarbon compound, whereas the inorganic character is a factor showing the influence of the static (ionic) nature of its substituent or substituents. The organic and inorganic character values of a given organic compound may be calculated by simple addition of organic and inorganic values assigned to respective groups from which the compound is constituted. Organic and inorganic character values of some groups are shown in Table 1.

TABLE 1

| Group | Organic character value | Inorganic character value |
|---|---|---|
| H | 0 | 0 |
| C | 20 | 0 |
| Phenyl | 120 (20 × 6) | 15 |
| Naphthyl | 200 (20 × 10) | 60 |
| Anthryl or Phenanthryl | 280 (20 × 14) | 105 |
| Hydroxyl | 0 | 100 |
| Carboxyl | 20 | 150 |
| Sulfonic acid | 0 | 250 |
| Sulfone | 40 | 110 |
| Chlorine | 40 | 10 |
| Bromine | 60 | 10 |
| Ether | 0 | 20 |
| Amide | 20 | 200 |
| Ketone | 20 | 65 |
| Ester | 20 | 60 |
| Ethylene | 40 | 2 |
| Amine | 0 | 70 |
| n-Member alicyclic | 20 × n | 10 |

For example, dichlorobenzenesulfonic acid has an organic character value of 200 (120(benzene)+80(two chlorine) and an inorganic character value of 285 (15(benzene)+20(two chlorine)+250(sulfonic acid)); and bisphenol S (bis(4-hydroxyphenyl)sulfone) monosulfonic acid has an organic character value of 280 (240(two phenyl)+40(sulfone)) and an inorganic character value of 590 (30(two phenyl)+200(two hydroxyl)+110(sulfone)+250(sulfonic acid). Thus, the ratios of organic character value to inorganic character value of dichlorobenzenesulfonic acid and bisphenol S monosulfonic acid are 0.702 (200/285) and 0.475 (280/590), respectively.

The term "intermolecular direct bond" used herein is intended to mean a direct bond between two monomers. For example, when the condensation product according to the present invention is composed of one monomer unit of the above formula (I) and one monomer unit of the above formula (II) wherein Y and Z are a naphthalenemonosulfonic acid radical and a benzenesulfonic acid radical, respectively, m, n, u and v are each l, p and s are each H, r is CHR-b where R is H and b is a direct bond, and q is a direct bond, then the condensation product has the formula:

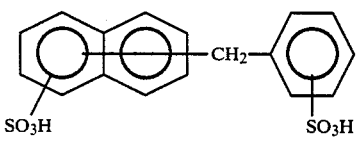

Preferably, the molar ratio of the monomer unit of the formula (I) to the monomer unit of the formula (II) of the condensation product according to the present invention is 1:10 to 50:1, more preferably 1:2 to 30:1.

In another aspect, the present invention provides a composition in the form of a dispersion, which comprises an aqueous medium, finely divided pitch and the above-described condensation product used as a dispersant.

In a further aspect, the present invention provides a method of forming a pitch in water slurry which comprises dispersing finely divided pitch in an aqueous medium in the presence of the above condensation product.

Other objects, features and advantages of the present invention will become apparent from the detailed description of the invention to follow.

DETAILED DESCRIPTION OF THE INVENTION

The novel condensation product according to the present invention may be obtained by reaction of an aldehyde and first and second, sulfonic acid or sulfonate group-containing aromatic compounds having ratios of their organic to inorganic character values of at least 0.6 and not more than 0.5, respectively. Examples of the aromatic rings of the first and second aromatic compounds include a benzene ring (inclusive of a biphenyl), naphthalene ring and anthracene ring. Preferably, the ratios of organic to inorganic character values are 0.6–2.0 and 0.1–0.5, respectively.

Illustrative of suitable first aromatic compounds are naphthalenemonosulfonic acid (0.645), anthracenemonosulfonic acid (0.789), phenanthrenemonosulfonic acid (0.790), carbozolemonosulfonic acid (0.730), dibutylnaphthalenemonosulfonic acid (1.16), nonylphenolmonosulfonic acid (0.820), dodecylphenolmonosulfonic acid (0.990), methylnaphthalenemonosulfonic acid (0.710), diphenylmonosulfonic acid (0.860), terphenylmonosulfonic acid (1.22), phenylphenolmonosulfonic acid (0.630), Bisphenol A monosulfonic acid (0.630), creosote oil sulfonic acid (more than 0.65).

Illustrative of suitable second aromatic compounds are naphthalenedisulfonic acid (0.357), anthracenedisulfonic acid (0.463), anthracenetrisulfonic acid (0.327), phenolsulfonic acid (0.329), naphtholsulfonic acid (0.487), sulfophthalic acid (0.283), cresolmonosulfonic acid (0.383), Bisphenol S monosulfonic acid (0.475), Bisphenol A disulfonic acid (0.417), p-chlorophenolsulfonic acid (0.427), o-phenylphenoldisulfonic acid (0.381). In the above illustrations, the numerals in the parentheses indicate the ratios of organic character values to inorganic character values.

Sulfonic acid group or groups of the first and second aromatic compounds may be in the free acid form (SO$_3$H) or in the form of a salt (SO$_3$M) where M represents an alkali metal such as sodium or potassium, an alkaline earth metal such as calcium or magnesium, ammonium ion, an organic amine such as monoethanolamine, diethanolamine or triethanolamine.

The above first and second aromatic compounds are reacted with an aldehyde to form the condensation product. Illustrative of suitable aldehydes are formaldehyde, acetaldehyde, glyoxal, paraformaldehyde and other alkyl aldehydes. The reaction is generally performed at a temperature of 90–150° C., preferably 100–130° C., in the presence of a strong acid such as sulfuric acid or hydrochloric acid. The product may be neutralized with an alkaline substance, if necessary.

In a preferred embodiment, the first and second aromatic compounds may be prepared at the same time by reaction of their corresponding non-sulfonated compounds with a sulfonating agent such as concentrated sulfuric acid, fuming sulfuric acid, anhydrous sulfuric acid or chlorosulfonic acid at a temperature of 0°–200° C. The resulting mixed compounds are then subjected to condensation reaction with an aldehyde.

When the first and second aromatic compounds differ with each other only in their number of sulfonic acid groups, it is convenient to first sulfonate the corresponding non-sulfonated aromatic compound to form a mixture of the first and second aromatic compounds, such as a mixture of mono- and di- or trisulfonic acids, the resulting mixture being subsequently reacted with an aldehyde for condensation.

The condensation may also be performed by first reacting one of the first and second aromatic compounds, generally the first compound, with an aldehyde, and then reacting the resulting condensation product with the other aromatic compound to obtain the desired condensation product.

Alternatively, when both the first and second aromatic compounds are phenolic compounds, such as derivatives of phenols, alkylphenols, cresol and xylenol, the condensation product according to the present invention may be prepared by first reacting the corresponding non-sulfonated phenolic compounds with an aldehyde in the presence of an acid or base catalyst, in the same manner as that for performing the conventional phenolformaldehyde condensation, the resulting condensation product being then sulfonated by reaction with the above-mentioned sulfonating agent. Sodium bisulfite and sodium metabisulfite may also be used as the sulfonating agent. Because of the difficulty in controlling sulfonation, this method is less preferred than the above methods, however.

Preferably, the degree of condensation (polymerization) of the condensation product is 2–200, more preferably 2–50. The weight ratio of the content of the first aromatic compound to the content of the second aromatic compound of the condensation product is preferably 40:60 to 99:1. The ratio of organic character value to the inorganic character value of the condensation product is preferably 0.2–1, more preferably 0.3–0.7.

The composition according to the present invention is comprised of an aqueous medium, finely divided pitch and the above-described condensation product which serves as a dispersant to maintain the pitch in the dispersed or slurried state.

Any pitch, both natural and synthetic, may be used for the purpose of the present invention. Pitch derived from coal or petroleum is a preferred raw material for the preparation of the composition of this invention. Illustrative of suitable petroleum pitches are those obtained, as extraction residues, by the solvent deasphalting treatment of heavy hydrocarbon oils, such as vacuum residues, with a solvent such as propane or butane; those separated, as residues, from products of the thermal cracking treatment of heavy hydrocarbon oils; those separated, as residues, from products of the catalytic cracking treatment of petroleum fractions; and those separated, as residues, from products of the heat treatment of heavy hydrocarbon oils with superheated steam. Illustrative of suitable coal pitches are coal tar pitch and vacuum bottoms of liquified coal. Treated or modified pitches obtained by thermally treating and/or hydrogenating the above petroleum-derived or coal-derived pitches may also be used for the purpose of the present invention. It is preferable to use pitch having a softening point of at least above 50° C.

It is important that the pitch should be finely divided. Preferably the pitch has an average particle size of between 40 and 70 μm. It is also preferred that at least 70 weight %, more preferably at least 80 weight % of the pitch have a particle size of not coarser than 200 mesh. The content of the pitch in the composition is preferably between 50 and 85 weight %, more preferably between 70 and 80 weight %. Too low a content of the pitch is unsuitable because the resulting composition fails to have a sufficient heating value. Too high a concentration of the pitch is also undesirable because it becomes difficult to maintain the composition in a suitably dispersed state.

The amount of the dispersant in the pitch-containing composition of the present invention varies according to the amount and kind of the pitch and the kind of the dispersant. Preferably, the dispersant is used in an amount of between 0.1 and 2 parts by weight, more preferably between 0.2 and 1 part by weight per 100 parts by weight of the pitch.

The composition of the present invention may be prepared in various manners. For example, pitch is first ground into particles by means of a hammer mill, to which is added an aqueous medium containing a dispersant dissolved or dispersed therein. The mixture is then subjected to a further pulverizing treatment by means of a ball mill, roll mill, sand mill, colloid mill or high speed shearing-type homogenizer (such as EIKA-ULTRATARAX manufactured by KIKA-WERK JANKE & KUNKEL KG) for finely pulverizing the pitch particles.

Alternatively, the pulverization may be effected in one step by milling coarse particles of pitch in an aqueous medium containing a dispersant dissolved or dispersed therein with the use of a blade-type colloid mill such as "TRIGONAL" (manufactured by SIEFER AG).

The comminution by the above-described mills or grinders may be performed generally at room temperature, but, if necessary, it can be conducted at an elevated temperature of up to 100° C. The composition of the present invention may be advantageously prepared by comminuting molten pitch in a dispersant-containing aqueous medium by means of the above-described high speed shearing-type homogenizer or high speed blade-type colloid mill.

The composition of the present invention is characterized by its dispersion-stability during storage. That is, the dispersed state of the composition is maintained for a long period of time. Further, the composition has a low viscosity and exhibits a good fluidity. Therefore, the composition is able to be passed through pipes and pumps and sprayed from a spray nozzle without difficulty. In addition, the temperature at which the gelation of the dispersed pitch particles contained in the composition occurs is high. This is advantageous since coagulation or precipitation of the pitch particles may result from the gelation. Thus, the composition of the present invention possesses all the properties required for use as a fuel for combustion burners. Because of the presence of water in the composition of the present invention, the generation of $NO_x$ and soot is low upon combustion thereof. The composition of this invention may also be suitably used as a raw material for the gasification of pitch.

The composition of this invention may contain an additive or additives. The incorporation of a phosphoric acid salt and/or a water-soluble polymeric substance into the pitch-containing composition is preferred because the homogeneity of the dispersion is improved without adversely affecting the other properties such as fluidity and high gelation temperature.

Examples of such a phosphoric acid salt include pyrophosphates, hexametaphosphates, tripolyphosphates and polymetaphosphates. Examples of the water-soluble polymeric substance include a polyethylene oxide, a polyvinyl alcohol, a polyacrylamide, methyl cellulose, carboxymethyl cellulose, hydroxyethyl cellulose, a guar gum, a hydroxypropyl guar gum and a carboxymethylhydroxypropyl guar gum. The content of the phosphoric acid salt is preferably in the range of between 0.01 and 0.5 part by weight, more preferably between 0.03 and 0.1 part by weight per 100 parts by weight of the pitch. The content of the water-soluble polymeric substance is in the range of between 0.001 and 0.5 part by weight, more preferably between 0.005 and 0.1 part by weight per 100 parts by weight of the pitch.

The following examples will further illustrate the present invention. In the Examples, "part" is on weight basis. The viscosity was measured at 25° C. using B-type viscosimeter (manufactured by Tokyo Keiki Co., Ltd., Rotor: No. 3, Revolutional speed: 60 r.p.m.). The stability of the dispersed phase was determined in the following manner:

Sample composition contained in a 100 ml glass cylinder was allowed to stand in a quiescent condition at 25° C. After 1, 7 and 30 days, the dispersion state of the sample was observed and the rigidity of the precipitate, if any, was measured.

The stability of dispersed state was rated on the basis of the following evaluation.

| Evaluation | Characterizing features |
| --- | --- |
| A (Excellent stability) | No precipitation |
| B (Good stability) | Slightly precipitated. The precipitate is very soft and easily homogeneously dispersed again by agitation. |
| C (Poor stability) | About half of the pitch is precipitated. The precipitate is hard. |
| D (Very poor stability) | Almost all the pitch is precipitated. The precipitate is very hard. |

EXAMPLE 1

Pitch having a melting point of 180° C., a volatile matter content of 41.1 weight % and an ash content of 0.1 weight % and being obtained, as a residue, by distillation of a product obtained by thermally cracking a vacuum residue was pulverized by means of a hammer mill operated at a rotational speed of 2300 r.p.m. to obtain a pulverized pitch, 32 % of which was able to pass through a sieve of 200 mesh. 70 parts of the pulverized pitch and 30 parts of an aqueous solution containing 0.35 part of a dispersant as shown in Table 1 and the balance of water were mixed by means of a high speed shearing-type homogenizer (manufactured by KIKA-WERK JANKE & KUNKEL AG, Germany) operated at a rotational speed of 10000 r.p.m. (circumferential speed: 18 m/sec), to obtain a pitch-in-water slurry. About 80-85 % of the pitch in the slurry was able to pass through a sieve of 200 mesh. The viscosity and the stability of the dispersion of the slurry were measured to obtain the results summarized in Table 1. The abbreviations shown in Table 1 (and Table 2) are as follows:

NMS: Naphthalenemonosulfonic acid (0.645)
NDS: Naphthalenedisulfonic acid (0.357)
TEA: Triethylamine
PMS: p-Phenolmonosulfonic acid (0.329)
SPA: Sulfophthalic acid (0.283)
CMS: Cresolmonosulfonic acid (0.383)
BPA: Bisphenol A disulfonic acid (0.417)
BPS: Bisphenol S disulfonic acid (0.475)
XMS: Xylenolmonosulfonic acid (0.438)
CPS: p-Chlorophenolmonosulfonic acid (0.427)
PPS: o-Phenylphenoldisulfonic acid(0.381)
AMS: Anthracenemonosulfonic acid (0.789)
ADS: Anthracenedisulfonic acid (0.463)
ANS: Crude anthracenesulfonic acid(0.780)
CSS: Creosote oil sulfonic acid (over 0.65)
FAL: Formaldehyde
ABS: Alkylbenzenesulfonic acid
LSA: Ligninsulfonic acid
MAN: Maleic anhydride
ACA: Acrylic acid The numerals in the parentheses shown above indicate the ratios of the organic character values to the inorganic character values of the above compounds.

The dispersants used in Experiments Nos. 1-16 and 19-22 are condensation products obtained by reaction of respective two aromatic compounds (A) and (B) shown in Table 1 with formaldehyde. The dispersants of Experiments Nos. 17 and 18 were obtained using glyoxal as the aldehyde for condensation. The molar ratio of the monomer unit (A) to the monomer unit (B) of each of the condensation products is also shown in Table 1. The degree of condensation was determined by way of gel permeation chromatography. Gelation temperature is the temperature at which the gelation of the pitch-in-water slurry occured.

TABLE 1

| Experiment No. | Dispersant Compound (A) | Dispersant Compound (B) | Form | Molar ratio of (A)/(B) | Degree of Condensation (average) | Viscosity (CP) | Stability After 1 day | Stability After 7 days | Stability After 30 days | Gelation Temperature (°C.) |
| --- | --- | --- | --- | --- | --- | --- | --- | --- | --- | --- |
| 1 | NMS | NDS | Free acid | 7.1 | 10 | 180 | A | A | B | 90< |
| 2 | NMS | NDS | Na salt | 7.1 | " | 220 | A | A | B | " |
| 3 | NMS | NDS | TEA salt | 3.4 | 8 | 170 | A | A | B | " |
| 4 | NMS | PMS | Free acid | 3.3 | 4 | 280 | A | A | A | " |
| 5 | NMS | PMS | K salt | 0.6 | 8 | 310 | A | A | A | " |
| 6 | NMS | PMS | Na salt | 2.0 | 10 | 230 | A | A | A | " |
| 7 | NMS | PMS | Na salt | 0.7 | 3 | 440 | A | A | B | 83 |
| 8 | NMS | PMS | Na salt | 1.6 | 6 | 430 | A | A | B | 81 |
| 9 | NMS | SPA | Free acid | 3.2 | 8 | 550 | A | A | A | 90< |
| 10 | NMS | SPA | NH4 salt | 2.2 | 7 | 540 | A | A | A | " |
| 11 | NMS | CMS | Na salt | 0.9 | 6 | 580 | A | A | A | " |
| 12 | NMS | BPA | Na salt | 1.3 | 6 | 480 | A | A | B | 78 |
| 13 | NMS | BPS | Na salt | 1.3 | 6 | 390 | A | A | B | 84 |
| 14 | NMS | XMS | NH4 salt | 2.9 | 10 | 260 | A | A | A | 90< |
| 15 | NMS | CPS | Na salt | 1.5 | 8 | 310 | A | A | A | " |

TABLE 1-continued

| Experiment No. | Dispersant Compound (A) | Dispersant Compound (B) | Form | Molar ratio of (A)/(B) | Degree of Condensation (average) | Viscosity (CP) | Stability After 1 day | Stability After 7 days | Stability After 30 days | Gelation Temperature (°C.) |
|---|---|---|---|---|---|---|---|---|---|---|
| 16 | NMS | PPA | TEA salt | 13.3 | 4 | 180 | A | A | A | 90< |
| 17 | AMS | ADS | Free acid | 24.5 | 3 | 330 | A | A | B | " |
| 18 | AMS | ADS | Na salt | 1.4 | 6 | 400 | A | A | B | 87 |
| 19 | AMS | PMS | Na salt | 2.8 | 4 | 320 | A | A | A | 90< |
| 20 | ANS | PMS | Na salt | 9* | 4 | 300 | A | A | A | " |
| 21 | CSS | PMS | Na salt | 4* | 2 | 290 | A | A | A | " |
| 22 | CSS | PMS | Free acid | 1* | 8 | 430 | A | A | A | 77 |
| 23 | Na salt of NMS—FAL condensation product | | | | | Unable to form a slurry | | | | |
| 24 | Na salt of ABS | | | | | | | | | |
| 25 | Na salt of LSA | | | | | | | | | |
| 26 | Na salt of MAN/ACA copolymer | | | | | | | | | |

*Weight ratio of A/B

EXAMPLE 2

A mixture containing 100 parts of naphthalene and 120 parts of 98 % sulfuric acid was reacted at 150°–160° C. for 3 hours to obtain naphthalenemonosulfonic acid, to which were added 60 parts of water, 60 parts of formalin (containing 37 % of formaldehyde) and 100 parts of p-phenolsulfonic acid while maintaining the temperature below 100° C. The mixture was then reacted at 100°–110° C. for 3 hours with stirring to effect condensation reaction of the aromatic compounds. The condensation product thus obtained was divided into three portions, which were neutralized with an aqueous sodium hydroxide solution, aqueous ammonia and ethanolamine, respectively, to obtain dispersants A-Na, A-NH$_4$, and A-TEA. Using the resultant dispersants, optionally together with an additive, a residual product from a solvent deasphalting treatment having a melting point of 139° C., a volatile matter content of 52.4 % and an ash content of 0.27 % was dispersed into water. Thus, the asphaltic product was pulverized to obtain coarse pitch particles. 75 parts of pitch particles (capable of passing 1 mm sieve) were mixed with 25 parts of an aqueous solution containing 0.35 part of the dispersant shown in Table 2 and 0.07 part of the additive also shown in Table 2 were mixed with each other by means of a high speed shearing-type homogenizer (EIKA ULTRATARAX R, circumferential speed 18 m/sec) at a rotational speed of 10000 r.p.m., whereby to obtain a pitch-in-water slurry. 80–85 % of the pitch in the slurry was found to pass through 200 mesh sieve. The properties of the slurry were as shown in Table 2.

TABLE 2

| Experiment No. | Dispersant | Additive | Viscosity (CP) | Stability After 1 day | Stability After 7 days | Stability After 30 days | Gelation Temperature (°C.) |
|---|---|---|---|---|---|---|---|
| 27 | A—Na | Potassium polymetaphosphate | 330 | A | A | A | 90< |
| 28 | A—Na | Hexameta phosphoric acid | 360 | A | A | A | 88 |
| 29 | A—Na | Potassium tripolyphosphate | 410 | A | A | A | 89 |
| 30 | A—Na | Carboxymethyl cellulose | 270 | A | A | A | 90< |
| 31 | A—Na | Polyethylene oxide (MW:10$^5$) | 520 | A | A | A | 90< |
| 32 | A—Na | Hydroxypropylmethyl cellulose | 280 | A | A | A | 90< |
| 33 | A—NH$_4$ | Hydroxyethyl cellulose | 300 | A | A | A | 90< |
| 34 | A—TEA | Hydroxypropyl guar gum | 330 | A | A | A | 90< |
| 35 | A—TEA | Carboxyvinyl polymer | 470 | A | A | A | 90< |
| 36 | A—TEA | Ammonium polystyrenesulfonate | 310 | A | A | A | 90< |
| 37 | A—Na | — | 460 | A | A | B | 81 |
| 38 | Na salt of NMS—FAL condensation product | Carboxymethyl cellulose | Unable to form a slurry | | | | |
| 39 | Na salt of NMS—FAL condensation product | Potassium tripolyphosphate | | | | | |
| 40 | Na salt of MAN/ACA copolymer | Sodium hexametaphosphate | | | | | |
| 41 | Na salt of MAN/ACA copolymer | Hydroxypropylmethyl cellulose | | | | | |

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all the changes which come within the meaning and range of equivalency of the claims are therefore intended to be embraced therein.

We claim:

1. A condensation product obtained by reaction of (A) a first aromatic compound Y containing one or more sulfonic acid or sulfonate groups and having a ratio of its organic values to inorganic value of at least 0.6, (B) a second aromatic compound Z containing one or more sulfonic acid or sulfonate groups and having a ratio of its organic character value to inorganic character value of not greater than 0.5 and (C) an aldehyde, said condensation product having repeating monomeric units (I) having an aromatic moiety derived from Y and monomeric units (II) having an aromatic moiety derived from Z, the molar ratio of I:II being 1:10 to 7.1:1.

2. The product according to claim 1, wherein the degree of condensation of the product is between 2 and 200 on the average.

3. The product according to claim 1, wherein said first compound is a member selected from the group consisting of naphthalenemonosulfonic acid, anthracenemonosulfonic acid, phenanthrenemonosulfonic acid, carbazolemonosulfonic acid, dibutylnaphthalenemonosulfonic acid, nonylphenolmonosulfonic acid, dodecylphenolmonosulfonic acid, methylnaphthalenemonosulfonic acid, diphenylmonosulfonic acid, terphenylmonosulfonic acid, phenylphenolmonosulfonic acid, Bisphenol A monosulfonic acid and creosote oil sulfonic acid, and said second compound is a member selected from the group consisting of naphthalenedisulfonic acid, anthracenedisulfonic acid, anthracenetrisulfonic acid, phenolsulfonic acid, naphtholsulfonic acid, sulfophthalic acid, cresolmonosulfonic acid, Bisphenol S monosulfonic acid, Bisphenol A disulfonic acid, p-chlorophenolsulfonic acid xlenolmonosulfonic acid and o-phenylphenoldisulfonic acid.

4. The product according to claim 3, wherein said aldehyde is formaldehyde.

5. A composition of matter comprising:
an aqueous medium;
particulate pitch; and a dispersant which is a condensation product according to claim 1.

6. The composition according to claim 5, wherein at least 70 weight % of the pitch has a particle size of not coarser than 200 mesh.

7. The composition according to claim 5, wherein the content of the pitch is between 50 and 85 weight %.

8. The composition according to claim 5, wherein the content of said dispersant is in the range of between 0.1 and 2 parts by weight per 100 parts by weight of the pitch.

9. The composition according to claim 5, further comprising a phosphoric acid salt.

10. The composition according to claim 9, wherein the phosphoric acid salt is selected from pyrophosphates, hexametaphosphates, tripolyphosphates and polymetaphosphates.

11. The composition according to claim 9, wherein the content of the phosphoric acid salt is in the range of between 0.01 and 0.5 part by weight per 100 parts by weight of the pitch.

12. The composition according to claim 5, further comprising a water-soluble polymeric substance.

13. The composition according to claim 12, wherein said water-soluble polymeric substance is selected from a polyethylene oxide, a polyvinyl alcohol, a polyacrylamide, a methyl cellulose, a carboxymethyl cellulose, hydroxyethyl cellulose, hydroxypropyl cellulose, hydroxypropylmethyl cellulose, a guar gum, a hydroxypropyl guar gum and a carboxymethylhydroxypropyl guar gum.

14. The composition as claimed in claim 13, wherein the content of the said water-soluble polymeric substance is in the range of between 0.001 and 0.5 part by weight per 100 parts by weight of the pitch.

15. The composition according to claim 5, wherein the content of the pitch is between 70 and 80 weight %.

16. The composition as claimed in claim 5, wherein the pitch has an average particle size of between 40 and 70 $\mu$m.

17. A method of forming a pitch-in-water slurry, comprising dispersing finely divided pitch into an aqueous medium in the presence of a dispersant according to claim 1.

18. A condensation product in accordance with claim 1 wherein said molar ratio is in the range of 1:2 to 7.1:1.

19. A condensation product in accordance with claim 1 wherein said molar ratio is in the range of 0.6 to 7.1.

20. A condensation product obtained by reaction of (A) a monosulfonated aromatic compound Y, (B) a disulfonated aromatic compound Z and (C) an aldehyde, said condensation product having repeating monomeric units (I) having an aromatic moiety derived from Y and monomeric units (II) having an aromatic moiety derived from Z, the molar ratio of I:II being 1:10 to 7.1:1.

* * * * *

UNITED STATES PATENT AND TRADEMARK OFFICE
CERTIFICATE OF CORRECTION

PATENT NO. : 4,565,546

DATED : January 21, 1986

INVENTOR(S) : OHZEKI et al

It is certified that error appears in the above-identified patent and that said Letters Patent is hereby corrected as shown below:

Column 9, line 21, "obtaih" should read --obtain--;

Column 11, line 10 (claim 1, line 4), "values" should read --value--; and

Column 11, lines 38, 39 (claim 3, lines 17, 18), "xlenolmonosulfonic acid" should read --, xylenolmonosulfonic acid--.

Signed and Sealed this

Twenty-ninth Day of July 1986

[SEAL]

Attest:

Attesting Officer

DONALD J. QUIGG

Commissioner of Patents and Trademarks